United States Patent

[11] 3,601,956

[72] Inventor Andreys O. Akermanis
  3401 N. Westmoreland Drive, Orlando, Fla. 32804
[21] Appl. No. 801,675
[22] Filed Feb. 24, 1969
[45] Patented Aug. 31, 1971

[54] UNDERWATER CUTTING DEVICE
  7 Claims, 7 Drawing Figs.
[52] U.S. Cl. ................................................... 56/8
[51] Int. Cl. ............................................... A01d 45/08
[50] Field of Search .......................................... 56/8

[56] References Cited
FOREIGN PATENTS

| 368,016 | 1906 | France ....................... | 56/8 |
| 776,788 | 1957 | Great Britain ............... | 56/8 |

Primary Examiner—Robert Peshock
Attorney—Julian C. Renfro

ABSTRACT: A hand operated cutting device to be utilized for the removal of underwater weeds and other growths, using pivotally mounted double-edged blades that automatically change position each time the direction of movement of the device changes, thus assuring that the blades will possess a desirable amount of sweepback when cutting, and enabling uncut weeds to slip off the end of the blades and thereby avoid fouling the device.

PATENTED AUG 31 1971 3,601,956
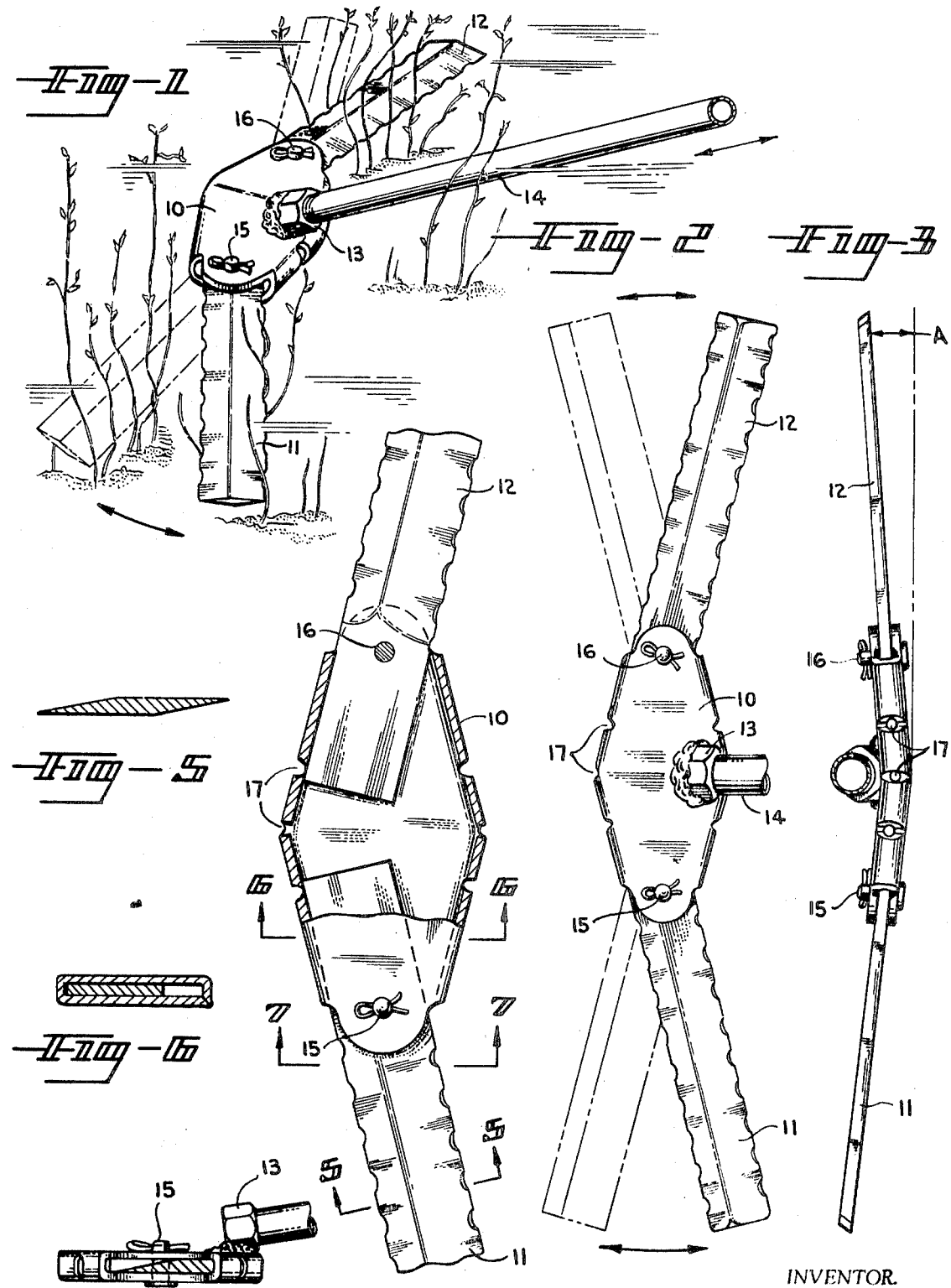
INVENTOR.
ANDREYS O. AKERMANIS
BY
Julian C. Renfro
ATTOR.

UNDERWATER CUTTING DEVICE

This invention relates to a cutting device by means of which growths such as submerged marine growths can be rapidly and efficiently cut without requiring the use of power tools, and more particularly to a double bladed arrangement capable of cutting marine growths when it is either being pushed or pulled by the user, with the blades advantageously being pivotally mounted so that weeds that are not cut during a given stroke can slide off the ends of the blades.

In the past, a number of weed cutting devices have been proposed, some of which are powered and some are not. The powered devices have generally been more effective, but nevertheless there are many instances in which man-powered devices are still desirable. For example, the private owner of a small lakefront lot that periodically needs clearing from the standpoint of marine growths is unlikely to have either the need or the money to warrant large scale equipment being brought in for weed removal. It is much more feasible for him to use a hand-operated device if in fact such a device will cut the growths and weeds upon reasonable attempts being made to do so.

Various fixed blade arrangements have been proposed, but these have generally had the disadvantage that uncut weeds quickly tend to cover the blades, causing them not to cut, and impeding motion of the device through the water. Gradually the blades have become so heavily laden with weeds that it became well nigh impossible for the user to continue to manipulate the device.

Other prior art arrangements have included the use of towed type cutting devices, such as may be pulled behind a motorboat. Some of these arrangements work comparatively well, but then again it is often the case that the small lakefront lot owner does not have a motorboat for pulling the device, and further, he may wish to clear marine growths from locations sufficiently shallow as to prevent the boat from passing close enough by the location as to enable the weed removal process to take place.

It is therefore a principal object of my invention to provide a cutting device for marine growths, capable of being mounted so that it can be rapidly pushed and pulled by the user, with the device having pivotally mounted double-edge blades or knives that serve to cut weeds effectively during each part of the operative stroke, without becoming fouled.

The blades are generally perpendicular to the direction of motion of the device, but in addition, the blades can each move for a limited number of degrees to enable the weeds not cut during a given stroke to slide off the blade and thus not to burden the blade and render the device ineffective. The pivotally mounted blades are preferably not coupled together, but the arrangement is nevertheless such that the blades will typically move together to acute angles on each side of an imaginary line through their pivot points. It is of course understood that each time the central member upon which the blades or knives are mounted is caused to change direction of motion, the position of the blades will accordingly change, thus making it possible for the blades to easily shed uncut weeds, no matter in which direction the device is being moved in a given instance.

These and other objects, features and advantages will be more apparent from a study of the appended drawings in which:

FIG. 1 is an overall perspective view of my device in operation;

FIG. 2 is a plan view illustrating the extent of motion of the blades between the two swept-back positions;

FIG. 3 is an edge view of the device of FIG. 2, revealing that if desired the blades may be angled upward from the plane of operation of the central member;

FIG. 4 is a view to a larger scale, with a portion of the central member removed to reveal internal construction;

FIG. 5 is a typical blade cross section, being taken at location 5—5 in FIG. 4;

FIG. 6 is a cross-sectional view taken at 6—6 in FIG. 4; and

FIG. 7 is an edge view of the device, partly in section, taken at location 7—7 in FIG. 4.

Referring first to FIG. 1, it will be noted that in this perspective view I have depicted my hand-operated cutter in the act of cutting unwanted marine growths. The central member 10 is revealed to be equipped with pivotally mounted blades or knives 11 and 12, and to be equipped with a boss or other suitable mounting means 13 arranged to receive a handle 14 or other operating device so that the user will be enabled to operate the device with rapid forward and backward motions. As will be noted from this figure as well as FIG. 2, the blades 11 and 12 are movable to a limited extent about pivot points 15 and 16, so that no matter in which direction the central mounting member 10 is being moved at a given instant by handle manipulation, the blades are caused to be in swept back relation insofar as motion of the device is concerned. The blades preferably are arranged to be able to move equal amounts on either side of an imaginary line extending through the pivot points.

As will also be noted from FIGS. 1 and 2, the blades preferably have serrations, this of course enhancing the cutting effect by in effect enabling a type of sawing action to be utilized against the marine growths.

With regard to FIGS. 2 and 3 it will be noted that a plurality of small holes 17 are provided along the fore and aft edges of the central member 10, thus enabling sand and other foreign material that might tend to enter the locations at which the blades operate to be discharged, so that it will not clog the mechanism. These holes actually permit some circulation of water through the central member or housing 10, and this self-cleaning arrangement enables the device to continue to be used for a prolonged length of time without it being necessary to disassemble same for manual cleaning.

Apparent from FIG. 3 is the fact that I may prefer to slope the blades upwardly somewhat with respect to the horizontal plane (i.e., the plane of operation of the device), which improves operating characteristics and tends to prevent the blades from occasionally digging into the bottom of the lake or other basin of water.

Referring to FIG. 4 it will be noted that the upper portion of the device 10 has been removed so that the portions of the blade members inboard of the pivot points 15 and 16 can be revealed to a larger scale. These inboard portions extend for a tangible length inside the member 10, with these inner blade member portions of course being arranged to clear each other. As will be understood, the forward and rear edges of the member 10 are of sturdy construction, and therefore strong enough to react the load imposed by the blades. This is to say, when the device is moving from right to left as viewed in FIG. 4, the water resistance effective on the outer portions of the blades and the inertia of the blades is sufficient to insure that the inner ends of the blades will be adjacent the inner forward portion of the central member 10. As will also be apparent, when the handle is moved so as to cause the center member to move from left to right, this of course causes the blades to move to the opposite swept back position shown in FIG. 2 in dashed lines, thus of course causing the inner ends of the blades to move adjacent the inner rear portion of the central member 10.

With regard to FIG. 5 it will be noted that this figure depicts and reveals a typical diamond shaped cross-sectional configuration of the blades, with this configuration being such as to give good operating results, to enable inexpensive manufacture, and to enable the owner of the device to keep the blades sharp using ordinary means.

FIG. 6 reveals the arrangement of a typical end of a blade member inside the housing 10, with it being understood that the end is caused to move through an acute angle inside the housing each time the direction of movement changes. The top to bottom clearance in the housing is such as to permit unimpeded blade motion throughout their operating range.

FIG. 7 reveals an end view of the center member, with the mounting means 13 being shown secured to the upper rear portion of the member 10, so that the handle 14 may be easily mounted thereon. Typically I use a handle with a threaded end, whose threads match complementary threads in the inside of the mounting means 13, so that the handle can be removed at the time cleaning and/or storage of my novel device is desired. To remove the blades or knives 11 and 12, it is only necessary to remove the pivot members, which for example may be smooth pins held in place at locations 15 and 16 by means of cotter keys.

I claim:

1. A hand operated cutting device comprising a pair of blades extending outwardly from a central member, said blades being double-edges, means for moving said central member back and forth in a direction substantially orthogonal to the normal position of said blades, said blades being pivotally mounted, and able to move for a limited number of degrees away from their normal position into a position of sweepback, the direction of the sweepback being different for the backward and forward directions of travel, said sweptback blades accomplishing a cutting of encountered weeds in both directions of travel, but with weeds uncut in a given stroke being encouraged by the angularlity of the blades to slide off, thus preventing fouling of the blades.

2. In a plant cutter for cutting underwater plants or the like, cutting structure including a pair of elongated knife members each having forward and rearward cutting edges, a central member upon which said knife members are pivotally mounted, means for moving said central member alternately in forward and rearward directions, said knife members normally extending substantially perpendicularly to such direction of motion, but movable away from a position of perpendicularity into a sweptback relationship with respect to said central member in response to said central member being in either operative direction, means for limiting the motion of said blades about their pivotal mountings, said knife members serving to cut weeds in both directions of travel, the angle of the sweepback being such as to allow uncut weeds to slip off, and thus avoid entangling said knife members.

3. The plant cutter as defined in claim 2 in which said knife members alternately move from one sweptback relationship in response to motion in the forward direction, into another sweptback relationship in response to motion in the rearward direction.

4. The plant cutter as defined in claim 2 in which said knife members are disposed upwardly at a slight angle to the plane of motion of said central member.

5. A manually operated cutting device for severing underwater growths or the like, comprising a central mounting member to which operating means may be attached, a pair of double-edged blade members hingedly attached to said central member, and extending outwardly to each side of said central member, said blade members being movable to either side of an imaginary line drawn perpendicularly to the line of motion of said cutting device, each of said blade members being attached to said central member at a location such that most of each blade member extends outwardly from said central member, but with a portion of each blade member disposed so as to be prevented by said central member from assuming more than a given amount of angularity with respect to the direction of motion of said cutting device.

6. The device as defined in claim 5 in which said central member is provided with holes fore and aft, through which water can travel during movement of said device, thus to achieve a self-cleaning action.

7. A manually operated cutting device for severing underwater growths comprising a central member upon which operating means may be attached, a pair of double edged blades extending outwardly to each side of said central member and being mounted generally perpendicular to the direction of intended motion of the device, said blades being pivotally mounted to said central member and being movable into a sweptback relationship with respect to said central member upon said device being moved, said blades assuming a sweptback relationship in one direction or the other, depending on the direction in which the device is being moved, and restraint means for preventing said blades from traveling angularly beyond a certain point, the sweepback of said blades allowing uncut weeds to easily slip off.